Nov. 22, 1949 G. SLAYTER ET AL 2,489,242
METHOD AND APPARATUS FOR MAKING FINE GLASS FIBERS
Filed April 27, 1944 3 Sheets-Sheet 1
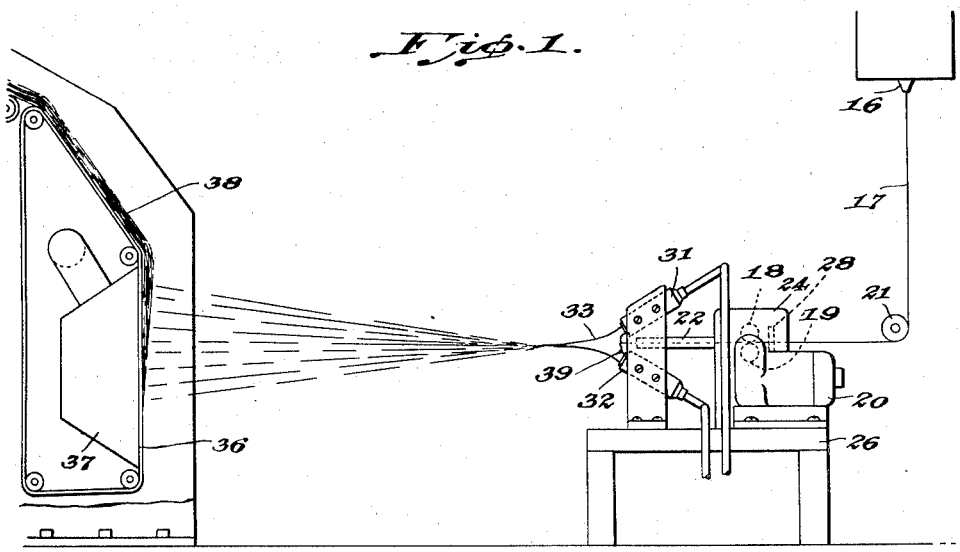
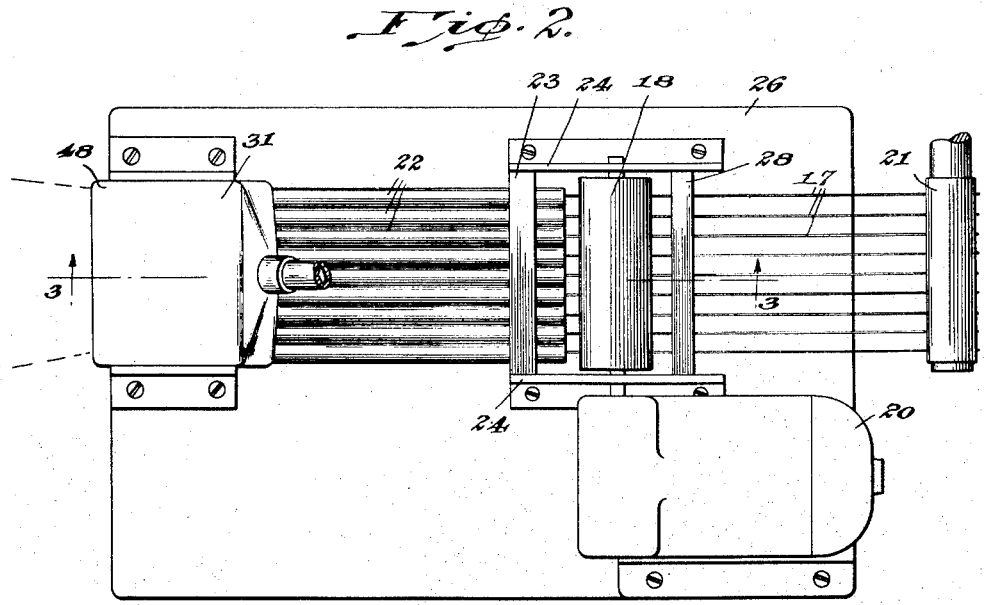
INVENTORS
Games Slayter and
Ed Fletcher,
BY
ATTORNEYS INVENTORS
Games Slayter and
Ed Fletcher,
BY
ATTORNEYS

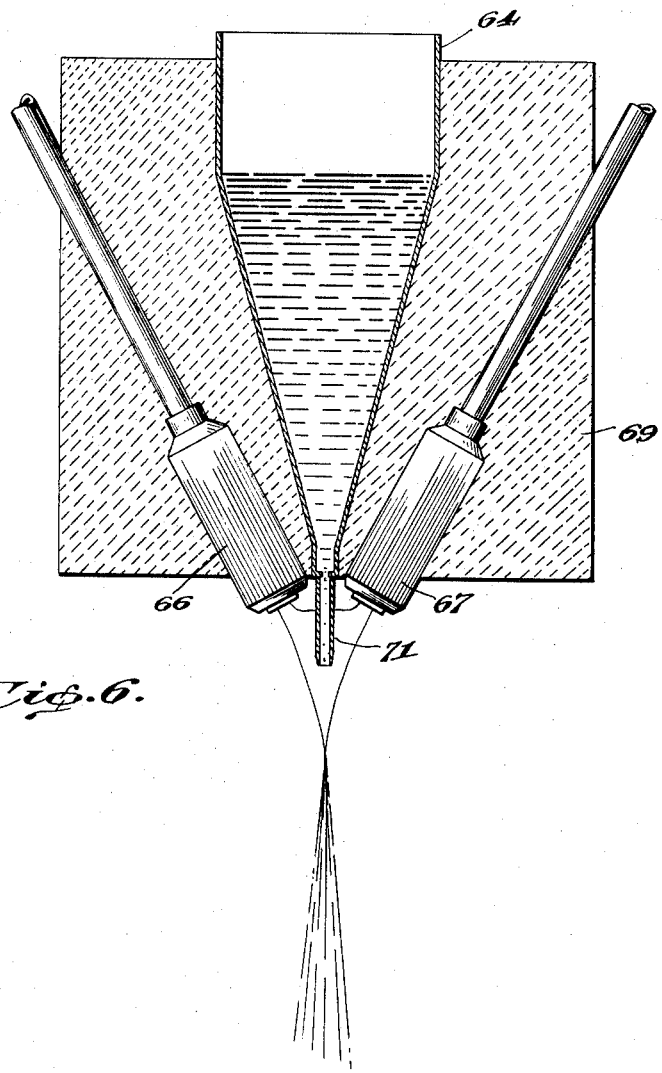

Patented Nov. 22, 1949

2,489,242

UNITED STATES PATENT OFFICE 2,489,242

METHOD AND APPARATUS FOR MAKING
FINE GLASS FIBERS

Games Slayter and Ed Fletcher, Newark, Ohio, assignors to Owens-Corning Fiberglas Corporation, Toledo, Ohio, a corporation of Delaware Application April 27, 1944, Serial No. 533,028

13 Claims. (Cl. 49—17)

1

The present invention relates to the production of fibrous glass and particularly to a method and apparatus for attenuating glass to the form of very fine fibers. Fibers produced by the present invention may be as small as four hundred-thousandths to ten hundred-thousandths of an inch, or approximately one to two and one-half microns, and even less in diameter. Fibers of this size are ideally suited for making sewing thread, for the production of inorganic paper, as reinforcement for plastics and other material, for fine textiles, for highly resilient webs, mats and blankets for thermal and acoustic insulation, and for many other purposes where larger fibers are not fully suitable. Larger fibers may also be produced by the invention with greater efficiency than heretofore.

One of the processes for making glass fibers that has proved to be most successful employs a gaseous blast to attenuate streams of molten glass. The blast is directed substantially in the direction of stream flow so that it exerts a continuous pulling force on the stream to draw out the stream into a glass fiber of great length. The streams are normally formed by flowing molten glass from orifices in a metal feeder or bushing, and usually the blast originates at a blower spaced a slight distance beneath the bushing. Steam or air under high pressure, that is, in the neighborhood of one hundred pounds or more per square inch, is supplied to the blower and the gaseous medium is directed by the blower onto opposite sides of the streams flowing from the bushing.

This process is well adapted for the production of larger fibers, that is, fibers twenty hundred-thousandths inch and more in diameter. Fibers smaller than this may be produced by this process, but as the size of the fibers is reduced the cost of operation relative to the rate of production measured in pounds of glass attenuated becomes unfavorable. This is due largely to the fact that the weight of the glass attenuated decreases as the square of the diameter of the fibers, while the size of the apparatus, the heat necessary to melt the glass and to raise it to the attenuating temperature, and the power supplied to the blower decrease little if any from the requirements for larger sized fibers.

In such attenuating processes, the speed of attenuation is limited, of course, by the speed of the gaseous attenuating medium. Previously, economical and practical considerations limited the pressure of the attenuating medium and consequently the speed of the blast so that in the

2 case of attenuating blasts of steam or air it was not feasible to increase the speed of the blast and hence the rate of attenuation much above about 300 feet per second.

Also, in the production of very fine glass fibers it is desirable to cause attenuation to take place over a relatively greater length of the molten glass stream to obtain the degree of attenuation necessary. In the process employing a blast of air or steam to attenuate the molten glass stream, the gaseous blast tends to cool the stream and solidify the glass being attenuated before the fullest attenuating effect of the blast has been realized.

In attempts to overcome this cooling effect of a gaseous blast it has been suggested that a combustible gas or a combustible gaseous mixture be supplied to form part or all of the blast and that the blast of combustible gas be ignited at or adjacent the point of contact between the blast and the glass to be attenuated.

The difficulty in this procedure lies in the fact that combustible gases and gaseous mixtures display a relatively low rate of flame propagation, and, although the rate of flame propagation varies with the particular gas employed and with the proportions of gas and oxygen in a combustible gaseous mixture, it is usually under about two hundred feet a second. Velocities of the blast of gas in excess of this cause the flame to be unstable and blow out. In the case of attenuation by means of a blast of combustible gas therefore, velocities of the attenuating blast were even more severely restricted by the need to have the initial velocity of the blast at or below the rate of flame propagation. For this reason a combustible gas directed onto a body of glass to attenuate the glass could elevate the temperature of the blast to some extent, but its commercial success was limited by this severe restriction in the velocity of the blast, limiting the rate of production to such an extent that very fine fibers were very costly.

It is the object of the present invention to provide an improved process for producing fibrous glass by means of a gaseous blast acting on a stream of glass, the blast being at high temperature and having such high velocities as to make practicable the economical production of very fine glass fibers. More particularly, it is an object of the present invention to greatly increase the speed of attenuation of molten glass streams by increasing the speed of the gaseous attenuating medium.

It is another object of the present invention to employ an attenuating medium that will maintain or increase the temperature of the glass being attenuated, thereby avoiding the premature solidification of the glass and lengthening the distance through which attenuation may take place.

It is another important object of the present invention to convert a combustible gaseous mixture into a blast of intensely hot gas moving at very high velocities, the velocity of the blast being greatly in excess of that obtained solely from the pressure and rate of burning of the particular gaseous mixture, and to introduce into this blast in a particular manner a body of glass which is attenuated by the blast into very fine fibers at high rates.

We have discovered that the products of combustion of a gas burned within an enclosed chamber may be arranged to attenuate glass either in the form of streams of molten glass or in the form of small rods of solid glass. The speed of the blast resulting from this combustion of gases may greatly exceed the maximum speed that may be practicably obtained with a blast of steam or air or with a flame of gas burned in the ordinary manner, with the result that the rate of attenuation obtained by the invention may be much higher than any previously obtained.

It is a further object of the present invention to both melt and attenuate glass by the same gaseous agent, thereby greatly conserving the heat required. By this means we are enabled to utilize a large percentage of the available energy to convert the glass to the form of fibers. All of the energy supplied contributes to the actual production of fibers, whereas in previous processes the molten glass had to be heated above the required temperature a sufficient amount to compensate for the cooling during attenuation.

It is a further object of the present invention to greatly increase the efficiency of attenuation so that less attenuating force is required and consequently a smaller volume of attenuating medium need be provided with a consequent decrease in the size of the apparatus, especially in the portion of the apparatus designed to handle the gaseous attenuating medium.

It is a still further object of the present invention to burn gas in a manner to provide an extremely high speed attenuating blast that is capable of using low cost combustible gaseous mixtures, such as ordinary fuel gas and air, to obtain the temperature and the speed required in the attenuating blast.

The principles of the present invention may be applied either to the production of glass fibers by the simultaneous melting and attenuation of glass or to the melting and conversion of glass-forming material to glass and the simultaneous attenuation of the newly-formed glass, or to the production of fibers by the attenuation of molten glass in the form of small streams flowing from a suitable feeder.

In the drawings:

Figure 1 is a diagrammatic side elevational view of apparatus embodying the present invention;

Figure 2 is an enlarged plan view of a portion of the apparatus shown in Figure 1;

Figure 6 is a cross-sectional view illustrating a further modification of the present invention.

Figure 3:
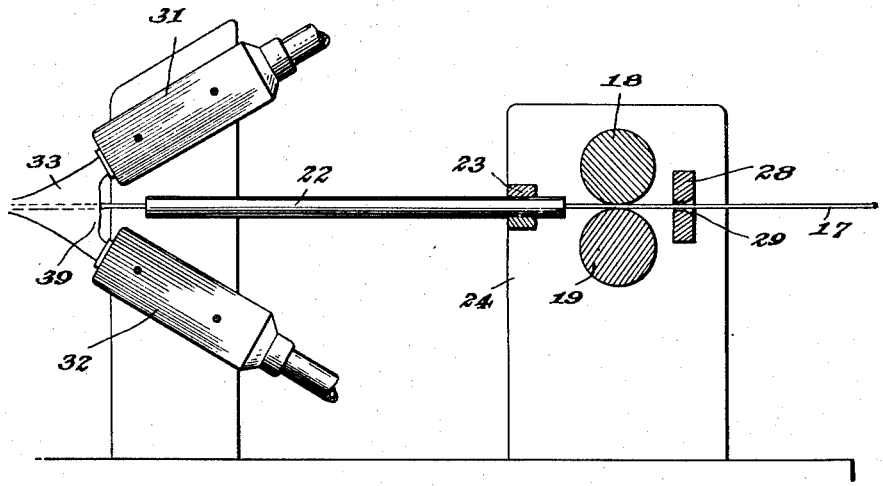
Figure 3 is a vertical sectional view taken on the line 3—3 of Figure 2.

This application is a continuation-in-part of our copending application Serial No. 452,318, filed July 25, 1942, which has become abandoned.

Briefly described, the present invention is the production of glass fibers by the attenuation of glass with a gaseous blast of intense heat, but differs from prior processes of this sort in that the blast is at a velocity that effects attenuation at such a rate that the production of very fine glass fibers, that is, fibers of from one micron or less to two and one-half microns in diameter, is commercially feasible. Larger fibers, say in diameters up to five or ten microns, may also be produced more economically than heretofore but it is in the production of the very fine fibers that the present invention has demonstrated the greatest advance over the prior art, such fine glass fibers having properties unknown heretofore in fibrous glass.

In the present case, the velocity of the attenuating blast is obtained using very low pressure gases whereas the attenuation of glass by the known processes employing steam or air or ignited blasts of gas require gas pressures in the neighborhood of 100 or 150 pounds per square inch. Also, they necessitate large steam boilers and air compressors, or supplies of expensive gases such as hydrogen, acetylene, oxygen, etc. The present process requires only gases at pressures in the neighborhood of 2 to 10 pounds per square inch, and may use ordinary fuel gas and air, thereby providing simplicity and great economy in the equipment and in the operation.

We have found that a gaseous blast having the requisite properties to efficiently fiberize glass and materials having attenuating characteristics similar to those of glass, is formed by causing the ignition of a combustible gaseous mixture within an enclosed chamber and exhausting the products of combustion of the gaseous mixture from the chamber in a restricted path. Glass or other material to be attenuated is fed into the blast at a point outside the combustion chamber and preferably close to the restricted exhaust path. The glass fed into the blast is preferably in the form of an elongated body or rod of solid glass but is may be a stream of molten glass if desired.

A rod of glass is fed into the blast at a constant rate and is continuously progressively softened or melted by the heat of the blast and as it reaches the proper viscosity is automatically drawn out at an exceedingly high rate into a fine fiber. The fiber remains suspended in the blast and is conveyed by the blast to a collecting means such as a traveling conveyor.

Referring to Figures 1 to 4, the preferred embodiment of the present invention comprises a glass feeder or bushing 16 which may be in the form of a long, narrow trough provided with a plurality of feeding orifices in its bottom wall. Glass cullet or glass batch is fed to the bushing in suitable manner and heated while in the bushing to a molten condition. The molten glass flows from the orifices in small streams which are attenuated to the form of filaments 17 by means of coacting feed rolls 18, 19 located a distance from the bushing sufficient to assure cooling of the filaments to solidification before engagement by the rolls. The feed roll 19 may be driven by an electric motor 20. Intermediate the bushing and the feed rolls a guide 21 may be arranged to guide the filaments although the guide may be dispensed with if the feed rolls are located approximately in the path of attenuation.

At the out-feeding side of the feed rolls, means are arranged to guide the filaments in parallel spaced paths. Such means are illustrated in the present instance as comprising a plurality of tubes 22 arranged in side by side and contacting relation. The tubes are held near their in-feeding ends in a bar 23 secured in place between standards 24 supported by a table 26. A guide plate 28 located at the in-feeding side of the feed rolls 18, 19 is also supported by the standards 24. The plate 28 is provided with a row of guiding openings 29 having expanding mouths, the openings being arranged in line with the tubes 22. The plate 28 facilitates insertion of the filaments between the feed rolls in properly spaced relation and in alignment with the tubes 22 at the beginning of the operation.

At the out-feeding ends of the tubes 22 one or more burners 31, 32 are arranged to direct high velocity, intensely hot gaseous blasts onto the filaments 17 as they emerge from the tube. In the present embodiment, the burners are arranged in a pair with the blasts from the respective burners directed toward each other so that they unite to form a gaseous envelope 33 enclosing the series of filaments emerging from the tubes 22. The heat of the gaseous envelope melts the filaments as they are fed into the envelope 33 and the gases in the envelope moving at a high rate of movement attenuate the molten filaments to fine fibers. As the fibers are formed they are carried through the atmosphere by the blast and deposited on a suitable foraminous conveyor 36 that may be moved across the path of the blast-borne fibers. A suction chamber 37 may be disposed at the rear side of the conveyor 36 and arranged to extend over the deposition zone of the fibers to aid in collecting the fibers and causing them to build up into a unitary mat 38. The mat is removed from the conveyor and further processed in any well known manner.

The blast from each of the burners 31, 32 is at very high temperature, being in the neighborhood of 2500° F. to 3000° F., and is moving at velocities not limited by the speed of flame propagation, but actually at velocities of about 500 to 700 feet per second and higher. The blast thus provides not only sufficient heat to raise the glass filaments to the attenuating temperature but also a very high rate of attenuation of the molten glass.

This high velocity of the blast is obtained by burning a combustible gaseous mixture in an enclosed chamber and exhausting the products of combustion through a restricted orifice to guide and accelerate the gases to form an intensely hot, high velocity blast.

The combustible gas may be of any suitable kind but for reasons of cost is preferably an ordinary fuel gas such as natural or manufactured fuel gas. The fuel gas is mixed with the proper amount of air by means of the ordinary and standard types of air and gas mixers. The gas and air mixture is taken from the mixer at moderate pressure, say about 2 to 6 pounds per square inch, and is led through an ordinary conduit to an enclosed chamber where ignition of the gaseous mixture takes place.

Figure 4:
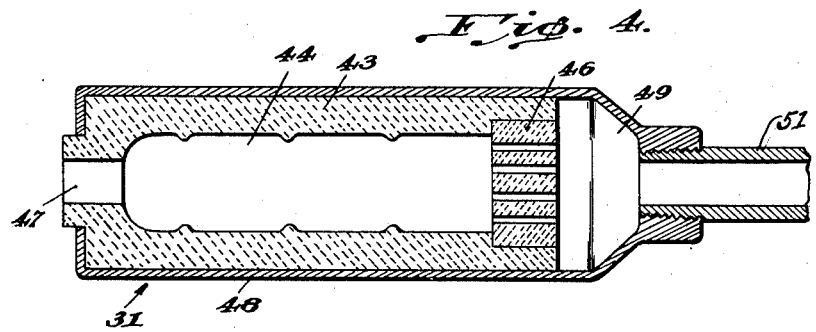
Figure 4 is a cross-sectional detailed view showing the preferred form of gas burning apparatus employed in the present invention.

Referring to Figure 4, one type of apparatus that may be used for ignition of the gaseous mixture to create the attenuating blast of the present invention comprises a body 43 of refractory material having a combustion chamber 44 therein. One end of the combustion chamber terminates at a perforated wall 46 having a plurality of small orifices extending therethrough. The other end of the chamber is formed as a wall having a restricted outlet passage 47 therein. The refractory body may be surrounded by a sheet metal shell 48, the shell being extended past one end of the refractory body to form an inlet chamber 49 between the end of the shell and the perforated wall 46. A pipe 51 connects with the shell to feed the combustible gaseous mixture into the inlet chamber 49.

The gaseous mixture enters the inlet chamber and passes through the orifices in the wall 46 at high velocity but slows down in the chamber 44 sufficiently to assure stable ignition of the gas to take place. During operation the walls of the chamber 44 are heated by the burning gas and the hot walls tend to increase the rate at which the gas entering the chamber burns. The resulting high rate of combustion causes a great expansion of the products of combustion which, as they pass through the outlet passage 47, are accelerated into a very high velocity blast of intense heat.

At the beginning of the operation the gaseous mixture is fed into the chamber 44 at velocities below the rate of flame propagation of the mixture in the atmosphere, but as the refractory walls heat up the rate of feed of the gas into the chamber is increased above this rate. The aim, in the interest of highest efficiency, is to feed as much gaseous mixture into the chamber as possible without causing the combustion to become unstable or take place at the outside of the chamber or to cease altogether.

The outlet passage 47 is substantially less in cross-sectional area than the chamber 44 so that the products of the combustion taking place within the chamber are accelerated as they pass through the restricted outlet to provide a blast of gas moving at very high velocity. The cross-sectional area of the outlet passage may be varied to some extent relative to the cross-sectional area of the chamber 44 depending upon the heat required in the blast leaving the outlet passage, passages of greater cross-sectional area relative to the cross-sectional area of the chamber resulting in greater heat of the blast but also causing a decrease in the velocity of the blast. Preferably, however, the cross-sectional area of the outlet passage 47 is no greater than necessary to obtain in the blast the heat required to raise the glass to be attenuated to the attenuating temperature. The best relation of the cross-sectional area of the passage 47 to the cross-sectional area of the chamber 44 may be determined by simple trial, but will be found to be usually within the range of 1:8 to 1:4, that is, the passage 47 will be from $\frac{1}{8}$ to $\frac{1}{4}$ the cross-sectional area of the chamber 44. This provides the highest velocity of the blast leaving the outlet passage coupled with sufficient heat of the blast to quickly melt the glass to be attenuated.

This process of burning combustible gaseous mixtures results in a blast having a velocity of 500 to 700 or more feet per second, as against about 150 feet per second for a mixture of ordinary fuel gas and air burned in the atmosphere, and having a temperature approaching 3000° F. and higher. This velocity and temperature may be obtained by using a mixture of fuel gas and air at pressures less than about 5 pounds per square inch. In addition to economies in apparatus and fuel, this low pressure makes unnecessary the elaborate safety devices required whenever combustible gaseous mixtures are passed through conduits at high pressure.

In the preferred form of the invention the glass to be attenuated is first melted in a feeder or bushing 16 and as it flows from the bushing is attenuated into primary filaments of relatively large diameter, for example, about two to ten thousandths of an inch in diameter. Directly after they are attenuated these primary filaments are fed into the blast coming from the burners 31, 32.

In this arrangement the rate of attenuation of the primary filaments at the bushing 16 is the same as the rate of feed of the filaments to the blast and this rate of feed is limited only by the speed at which the primary filaments are melted by the blast and the speed with which the molten glass is attenuated by the blast into fibers. If the rate of feed of the primary filaments to the blast is increased the rate of attenuation of the primary filaments at the bushing is, of course, correspondingly increased. With constant temperature at the bushing, the increase in the rate of attenuation at the bushing causes a decrease in the diameter of the primary filaments. But since these smaller primary filaments are fed to the blasts at a higher rate, the volume of glass fed into the blasts per unit of time remains the same. Therefore, the rate of feed may be varied within rather wide limits because of this relation between the rate of attenuation at the bushing 16 and the rate of feed of the primary filaments into the blast. Particularly high efficiencies result if primary filaments of from four to six thousandths of an inch are attenuated at the bushing and these filaments are fed into the blast at rates of from 50 to 100 feet a minute to produce fine glass fibers of from two to four microns in diameter.

Variations in the size of the fibers attenuated by the blast may be made most readily by varying the size of the primary filaments while maintaining the rate of feed of the filaments the same, or by varying the rate at which the primary filaments are attenuated and hence the rate at which they are fed into the blast while maintaining the size of the filaments constant, or by variations in both respects. Such changes in the diameter of the primary filaments relative to the rate of attenuation may be effected in any suitable way, as by varying the temperature of the molten glass in the feeder or by changing the size of the orifices in the feeder through which the molten glass flows.

As the primary filaments near and enter the blast from the burners 31, 32, they are progressively heated until they reach the attenuating temperature and they then start to elongate under the attenuating effect of the blast and they continue to be heated and drawn out by the blasts over a substantial distance. Since the blast is well above the softening temperature of the glass, the glass is maintained in an attenuating condition for a time sufficient to permit the full effect of the attenuating force of the blast to be realized so that very fine glass fibers may be produced.

The arrangement of the burners 31, 32 illustrated in Figure 1 has been found preferable although one or more burners disposed in other arrangements may be employed if desired. The arrangement of the burners, however, should be such that the blasts of gases from the burners envelope the filaments of glass and exclude induced currents of atmospheric air from direct contact with the glass filaments. Air induced into the interior of the gaseous blast will not only tend to cool the molten glass when the filaments are melted but may also blanket the filaments and prevent direct engagement between the blasts and the molten glass filaments, thereby decreasing the attenuating force applied to the molten glass by the blasts.

We have found that the application of these principles is most readily effected and high efficiency is realized if the burners of a pair are so arranged that the flames are directed toward each other at an included angle of approximately 50 to 60 degrees and with the direction of feed of the filaments preferably bisecting this angle. With this arrangement there is a slight tendency of the combustion gases at the apex of the included angle to blow or puff back in the direction counter to the direction of feed of the filaments. This apparently creates a heating region, indicated at 39 in Figures 1 and 3, where the blast has no attenuating effect upon the filaments and, in fact, seems to act on the filaments in a direction counter to the attenuating direction.

This phenomenon apparently serves two purposes. It acts to prevent the induction of surrounding atmospheric air into the envelope of the blast and around the filaments and as a result provides the most efficient application of the blast to the filaments. Also, as the filaments soften, this zone 39 where the gases of the blast move counter to the attenuating direction tends to retard forward movement of the softened glass so that the filament is held against the attenuating force while the forward portions thereof are drawn out by the attenuating portion of the envelope with the result that a high degree of attenuation is attained. We have found that if this zone of reversely moving glass is not provided there is a tendency for molten glass to break away from the ends of the filaments in drops that are thrown out by the attenuating gases as beads or shot instead of being drawn out into fibers.

Whereas the invention has been described in connection with the attenuation of primary filaments 17 and the simultaneous feeding of these filaments into the attenuating blast to produce fine fibers, the principles of the present invention are applicable to the attenuation of primary glass filaments that have been formed independently. For instance, a large number of filaments may be attenuated from streams of molten glass flowing from a bushing or formed in other suitable manner and these primary filaments wound on a reel or spool or otherwise packaged. The filaments from such a package may be fed into the attenuating blast in the manner previously described.

Figure 5:
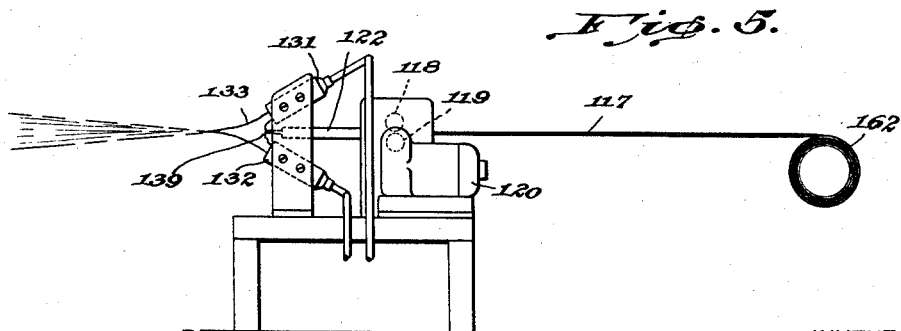
Figure 5 is a view similar to Figure 1 but illustrating a modification of the present invention.

Such a modification is illustrated in Figure 5 in which similar parts are designated by similar reference numerals raised to the series 100. A reel or spool 162 of continuous glass filaments is located in advance of the feed rolls 118, 119 and the filaments 117 are unwound from the reel and fed by the feed rolls through the tubes 122 into the attenuating blast. This arrangement may be preferable where it is possible to attenuate a large number of filaments at a high rate of speed from a single bushing or feeder. Under these conditions one bushing or feeder may serve to supply a large number of secondary attenuating stations with primary filaments.

Figure 6 illustrates a modified form of the present invention in which streams of molten glass are attenuated by the high speed blast. In this form a bushing or feeder 64 adapted to contain molten glass flows the molten glass in small streams through orifices in its bottom wall. Burners 66, 67 are located at opposite sides of the bushing and are arranged to direct the blasts emanating therefrom toward each other at approximately a 50 to 60 degree included angle. These burners are similar to the burners 31, 32 illustrated in Figures 1 to 4. The burners and the bushing are preferably completely enclosed within a refractory block 69.

With this arrangement of the burners and bushing, trouble may be experienced in getting the molten glass streams which flow from the orifices of the bushing to enter the envelope of gas formed by the blasts from the burners. For this reason it is sometimes desirable to provide an elongated tube 71 aligned with each orifice 65 to conduct the molten glass to a point well within the envelope of the blast. In this way the molten glass as it emerges from the end of the tube 71 is immediately acted upon by the attenuating blast and drawn out into fine glass fibers. The fibers as they are formed may be deposited on a conveyor or other suitable collecting surface in usual manner.

This arrangement of burners closely related to the molten glass feeder is highly advantageous from the standpoint of heat conservation. A large proportion of the heat passing outwardly through the bodies of the burners is conducted to the bushing to aid in maintaining the temperature of the molten glass therein, attaining a highly efficient process for making very fine glass fibers.

It has been found that the total heat input with the present invention may be less than that required in prior processes. This is believed to result from the fact that a much larger proportion of the available energy is utilized in actual melting and attenuating and there is no loss due to the cooling of the streams by the attenuating medium as where air or steam is used to attenuate the molten glass.

Although the above description refers to particular sizes, rates of feed of the primary filaments, and particular sizes of the finished fibers, the invention is not to be limited thereby, since rather than being limitations these are in the nature of examples to illustrate the principle of operation and decided advantages of the present invention. The size of the primary filaments and the rate of feed thereof may, of course, be varied through a wide range depending upon the particular type of gas employed, the arrangement of the burners, and the fineness and uniformity desired in the finished fibers. Selections of all these factors may be made as desired within the spirit of the present invention and the scope of the claims.

It has been found that glass fibers of the fineness resulting from the present process have properties differing greatly from the properties of previously produced coarser fibers. Fibers of a few hundred-thousandths of an inch in diameter collected in loose masses or when bonded together into mats display extremely high acoustic properties and mats of such fibers may be used as acoustic lining for vehicles such as aircraft and automobiles, may be used alone or covered with fabric as acoustic draperies, and may be applied in thin sheets to walls to form an acoustic covering. When used in the latter way the sheets may be decorated suitably as by being coated or having designs stenciled thereon in simulation of wall paper.

The distinctive properties of fibers of the fineness achieved by the present invention are dramatically displayed when the fibers are bonded together into mats, say from ¼ to 1 inch in thickness. The bonding is accomplished by distributing throughout the mat a small amount, for instance, 2 to 10% by weight on the basis of glass in the mat, of a rigid binding agent. Thermosetting resins such as phenol and urea formaldehyde are admirably suited to this purpose but the thermoplastic synthesic resins such as cellulose acetate or nitrate, etc., may also be used.

In making the mats the fibers as or after they are collected on a conveyor following their attenuation may be sprayed with the binding agent in solution or suspension in water or other vehicle and then compacted while being heated to cure or set the binder. A small amount of lubricating substance such as petroleum oil may be added to the binder solution or suspension if desired.

A mat made in this way is highly flexible, in fact it may be rolled up into a tight roll. At the same time it is of highly permanent dimensions and is so resilient that regardless of how deformed it immediately springs back to its original shape. Because of this such mats may be rolled or folded for shipment without the slightest impairment. So far as we are aware, these are completely novel properties in the case of mineral fiber insulating mats bonded into permanent form.

These mats are highly useful as pads, cushions, mattresses, and the like. The mats may be made of relatively high density by increasing the compacting pressure during the time the binder is being set to form dense sheets of fibrous glass that are useful as electrical insulation, and that may be coated and embossed suitably to have the appearance of leather and thus form a moisture and heat resistant leather substitute. In the first of these latter two cases the amount of binding material is preferably sufficient to fill all interstices and voids within the fibrous material and form a solid body of resinous material free of voids and having the glass fibers distributed therethrough. In the second of these cases, to increase flexibility when desired less binding material may be employed so that the body of fibrous material remains replete with voids throughout a major portion of its thickness. However, one or both major surfaces of the mat may be impregnated or coated with sufficient resin to form a substantially continuous, impervious surface. High density mats of these fine fibers with or without a binding material are also useful as separators between the plates of storage batteries.

Loose masses or bonded mats of such fine fibers have high thermal insulating properties and may be used as lining for clothing such as jackets, shoes, etc. They may also be used as ordinary thermal insulation with the advantage that very thin mats of the material are effective to provide the insulation that was only obtainable heretofore by rather thick coverings of insulating material.

Such fine fibers may also be used as reinforcement or filling for resins, may be used to make an inorganic paper much in the same manner that paper is now made from wood and rag pulp. These fine fibers represent an enormous surface area relative to the weight of the glass making up the fibers and are therefore ideally suited for use as filters for liquid and air. The same properties make these fine fibers advantageous for the manufacture of wicking. The enormous surface area and the extremely large number of fibers in a small mass of the fibrous material permit such fibers to be used to provide buoyancy in such things as life preservers, the fibers in such a case being coated with suitable water repellant substance. These fibers are also useful as friction material such as brake lining.

A mass of the fibers may be enclosed in inner tubes for pneumatic tires to partly fill the tube and thus, due to the high acoustic properties of the mass, reduce road noise. Also, in case of a blowout the fibers will pack in the opening to such an extent that they prevent rapid movement of air through the opening and thus decrease the rate of deflation of the tire. It has been found that the addition of these very fine fibers to many liquids such as kerosene, resin solutions, etc., is effective to increase the viscosity of the liquids to a great extent even when only a very small percentage of fibers are added. This is due apparently to the extreme fineness and the great surface area of the fibers.

The fine fibers of the present invention may also be formed into strands and yarns by carding and spinning in the usual way, or by following the teaching of the Tucker and Lannan Patent No. 2,264,345. These yarns and strands are very soft and highly flexible and may be interwoven with similar yarns or with yarns of coarser glass fibers to form fabrics that have the feel and appearance of the most expensive fabrics of organic fibers coupled, of course, with fireproofness and resistance to moisture. Such yarns may also be interwoven with yarns of other fibers such as cotton, wool, nylon, Saran, rayon, etc.

Various modifications of the present process and apparatus may be made within the spirit of the invention and the scope of the claims.

We claim:

1. The process of making fibers from a material that can be drawn out into fibers when softened by heat which comprises introducing gases into a chamber, substantially completely burning within the chamber all of the gases introduced into said chamber, controlling the rate of introduction of the gases into the chamber in proportion to the volume of said chamber and discharging the burned gases from the chamber at such a rate with respect to the quantity of gas burned within the chamber as to produce a blast having a temperature which exceeds the softening temperature of the material and having a velocity high enough to draw out the softened material into fibers, feeding heat softenable material into the burned gases in said blast, heating the material by the heat of the blast, and drawing out the softened material into fibers by the velocity of the blast.

2. The process of making glass fibers which comprises substantially completely burning a combustible mixture of gases within a chamber and discharging the burned gases from the chamber as a blast, introducing the mixture of gases into the chamber at such a rate in proportion to the volume of the chamber and restricting the discharge of the burned gases from the chamber to such an extent with respect to the quantity of gas burned within the chamber as to accelerate the gases of the blast to a velocity high enough to draw out softened glass into fibers and to heat the gases of the blast to a temperature exceeding the temperature at which the glass is drawn out into fibers by the velocity of the blast, feeding a body of solid glass into the blast of burned gases, progressively softening the advancing end of the body by the heat of the burned gases in said blast, and drawing out the softened glass at the advancing end of the body to fibers by the velocity of the blast.

3. The process of making glass fibers which comprises substantially completely burning a combustible mixture of gases within a chamber and discharging the burned gases from the chamber, introducing the combustible mixture of gases into the chamber at such a rate with respect to the volume of the chamber and restricting the discharge of the burned gases from the chamber to such an extent with respect to the quantity of gas burned as to form a blast composed substantially entirely of burned gases having a temperature which exceeds the softening temperature of glass and having a velocity high enough to draw out the softened glass into fine fibers, feeding a body of glass into the burned gases making up said blast, heating the glass body within the blast by the heat of the burned gases, and drawing out the advancing end of the heated glass body into fibers by the velocity of the blast.

4. The method of attenuating glass fibers which comprises directing a plurality of flames from separate sources toward each other in the air at such an angle that the flames join to form a body of highly heated gas moving at high speed with a small portion of said body at one end thereof moving in a direction counter to the direction of movement of the main portion of said body, and feeding a glass filament in the general direction of movement of the main portion of said body of gas and into said body at the end thereof at which the reversely moving portion of said body is located so that as the glass filament melts movement thereof with the main portion of the body of gas is resisted by the reversely moving portion of the body of gas to exert tensile force on said filament as it is melted that is sufficient to attenuate it to a very fine fiber.

5. The process of making fibers from a material that can be drawn out into fibers when softened by heat which comprises substantially completely burning a combustible mixture of gases within a chamber at a pressure above atmospheric pressure, introducing the combustible mixture of gases into the chamber at such a rate in relation to the volume of the chamber and discharging the burned gases from the chamber at such a rate as to force the burned gases from the chamber in the form of a blast composed substantially entirely of burned gases and having a temperature exceeding the softening temperature of the material and having a velocity sufficiently high to draw out the heat-softened material into fibers, feeding a body of the material into the burned gases in said blast along a path offset laterally from the chamber, and heating the material as it is fed into the blast of burned gases by the heat of the burned gases and drawing out the heated material within the blast into fine fibers by the velocity of the burned gases.

6. The process of making glass fibers which comprises introducing a combustible mixture of gases into a chamber, substantially completely burning the combustible mixture of gases within the chamber and discharging the burned gases from the chamber, controlling the rate of introduction of the combustible mixture of gases into the chamber in proportion to the volume of the chamber and controlling the discharge of the products of combustion from the chamber to produce a rate of combustion of the gases within the chamber sufficiently high to force the products of combustion from the chamber in the form of a blast composed substantially entirely of products of combustion and having a temperature exceeding the softening temperature of glass and having a velocity sufficiently high to draw out the softened glass into fibers, feeding a body of glass into the products of combustion in said blast along a path offset laterally from the chamber, progressively softening the advancing end of the body as it is fed into the blast by the heat of the products of combustion, and progressively drawing out the softened end of the body to fibers by the velocity of the blast.

7. The process of making glass fibers which comprises substantially completely burning a combustible mixture of gases within a chamber at pressures above atmospheric and in such quantities with respect to the volume of the chamber as to produce a rate of combustion of the gases within the chamber sufficiently high to force the burned gases from the chamber in the form of a blast having a temperature exceeding the softening temperature of the glass and having a velocity sufficiently high to draw out the softened glass into fibers, feeding a plurality of rods of glass into the burned gases in said blast along a path which is offset laterally from the chamber and with the rods spaced apart in a direction extending across the width of the blast, softening the advancing ends of the rods as they are fed into the burned gases in said blast by the heat of said gases, and progressively drawing out the softened ends of the rods to fibers by the velocity of the burned gases.

8. The process of making glass fibers which comprises burning a combustible mixture of gases within a chamber and discharging the burned gases from the chamber, controlling the rate of introduction of the combustible mixture of gases into the chamber in proportion to the volume of the chamber and restricting the discharge of the burned gases from the chamber to such an extent with respect to the quantity of gas burned as to produce a rate of combustion of the gases within the chamber sufficiently high to force the burned gases from the chamber in the form of a blast composed substantially entirely of burned gases and having a temperature exceeding the softening temperature of the glass and a velocity high enough to draw out the glass softened by the blast into fibers, feeding a plurality of bodies of glass into the blast with the bodies arranged in a row extending across the width of the blast, and simultaneously heating the advancing ends of all the bodies by the burned gases in the blast and drawing out the heated glass into fibers by the velocity of the burned gases.

9. The process of making glass fibers which comprises introducing a combustible mixture of gases into laterally spaced-apart combustion chambers, simultaneously burning the combustible gaseous mixture in the said chambers and discharging the burned gases from the chambers toward a common zone, forming a blast of the burned gases in said zone by restricting the discharge of the burned gases from said chambers to such an extent with respect to the quantity of gas burned in the chambers as to impart a temperature to the burned gases in said blast exceeding the softening temperature of glass and to impart a velocity to the burned gases in the blast which is high enough to draw out the softened glass into fibers, feeding a glass rod into the burned gases in said zone, and softening the advancing end of the rod and drawing out the softened end of the rod into fine fibers by the force of the burned gases in said zone.

10. Apparatus for producing glass fibers comprising a burner having a combustion chamber within which a combustible gaseous mixture is burned and having an outlet opening through one wall of the burner, said chamber being so proportioned with respect to the cross sectional area of the outlet opening that the burned gases are forced from the chamber in the form of a blast having a temperature greater than the softening temperature of the glass and having a velocity high enough to attenuate softened glass into fibers, and means to one side of the burner for feeding bodies of glass into the burned gases in said blast whereby the bodies are heated and drawn out to fibers by the heat and velocity of the burned gases.

11. Apparatus for producing glass fibers comprising a burner having a combustion chamber within which a combustible gaseous mixture is burned and having through one wall an outlet opening of substantially greater length than width, said chamber being so proportioned with respect to the area of the outlet opening that the burned gases are forced through the outlet opening in the form of a blast having a substantially greater width than thickness and having a temperature beyond the outlet opening above the softening point of glass and a velocity sufficiently high to attenuate the softened glass into fibers, and means for feeding into the blast a plurality of glass rods arranged in a row extending across the width of the blast, said feeding means including coacting feed rolls located to one side of the burner in positions to grip the rods therebetween and feed said rods endwise into the blast.

12. Apparatus for producing glass fibers comprising a burner having a combustion chamber within which a combustible gaseous mixture is burned and having through one wall an outlet opening of substantially greater length than width, said chamber being so proportioned with respect to the area of the outlet opening that the burned gases are forced through the outlet opening in the form of a blast having a substantially greater width than thickness and having a temperature beyond the outlet opening above the softening point of glass and a velocity sufficiently high to attenuate the softened glass into fibers, and means for feeding a plurality of glass rods arranged in a row extending across the width of the blast into the burned gases in said blast to soften the advancing ends of the rods to a point where the softened glass is drawn out into fine fibers by the force of the burned gases.

13. Apparatus for producing glass fibers comprising a pair of burners each having a combustion chamber within which a combustible gaseous mixture is adapted to be burned and having an outlet opening in one wall thereof, means supporting said burners in laterally spaced relationship with the outlet openings directed toward a common zone in the atmosphere, each chamber being so proportioned with respect to the area of the associated outlet opening that the burned gases are forced through the respective outlet openings at high velocity and meet at said zone to provide a single blast having a temperature in said zone exceeding the softening temperature of glass and having a velocity high enough to attenuate the softened glass into fibers, means for feeding glass rods in side by side relationship into the burned gases in said zone along a path extending between the burners, said feeding means including coacting feed rolls supported to one side of the burners in positions to grip the glass rods therebetween and feed said rods endwise into the burned gases in said zone, and tubes supported at the out-feeding side of the rolls in positions to respectively receive the glass rods and guide the same into said zone.

GAMES SLAYTER.
     ED FLETCHER.

REFERENCES CITED

The following references are of record in the file of this patent:

UNITED STATES PATENTS

| Number | Name | Date |
|---|---|---|
| 805,963 | Jackson | Nov. 28, 1905 |
| 1,328,446 | Odam | Jan. 20, 1920 |
| 1,689,551 | Hammond | Oct. 30, 1928 |
| 1,702,731 | Hymer | Feb. 19, 1929 |
| 1,769,181 | Jackson | July 1, 1930 |
| 1,948,737 | Stettner | Feb. 27, 1934 |
| 2,175,225 | Slayter | Oct. 10, 1939 |
| 2,192,944 | Thomas | Mar. 12, 1940 |
| 2,206,059 | Slayter | July 2, 1940 |
| 2,227,357 | Martin | Dec. 31, 1940 |
| 2,269,459 | Kleist | Jan. 13, 1942 |
| 2,318,244 | McClure | May 4, 1943 |
| 2,338,473 | Von Pazsiczky | Jan. 4, 1944 |

FOREIGN PATENTS

| Number | Country | Date |
|---|---|---|
| 206,132 | Great Britain | Jan. 12, 1925 |
| 481,690 | Great Britain | Mar. 16, 1938 |
| 840,209 | France | Jan. 11, 1939 |